J. HOPKINSON.
COMPUTING SCALE.
APPLICATION FILED OCT. 18, 1913.
1,158,219.
Patented Oct. 26, 1915.
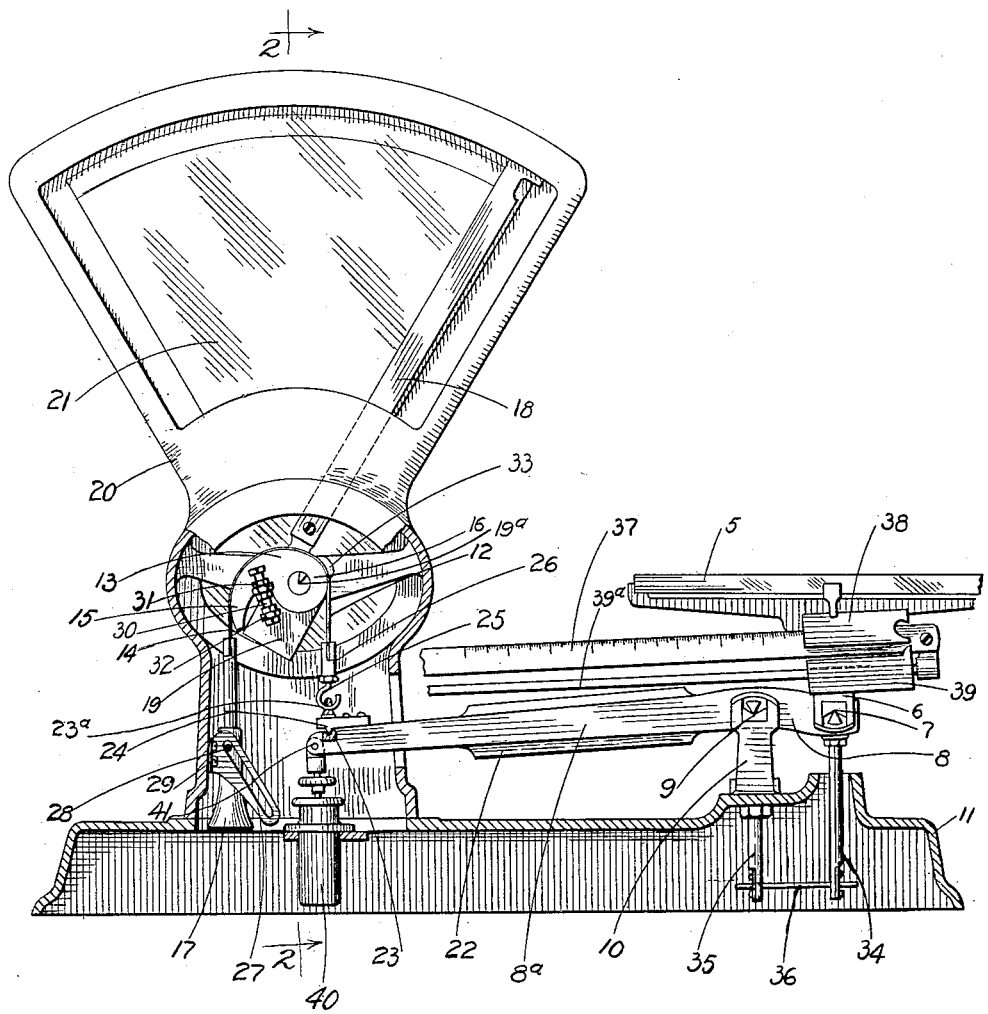
Witnesses:
Inventor:
Joseph Hopkinson
By Sheridan, Wilkinson & Scott
Atty's

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,158,219.  Specification of Letters Patent.  Patented Oct. 26, 1915.

Application filed October 18, 1913. Serial No. 796,021.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to automatic weighing scales in the class known as computing scales.

The object of my invention is to provide an automatic scale for weighing goods in which the goods to be weighed are counterbalanced by a weight which is directly connected to the lever supports which carry the platform and in which a second suspended weight has a tendency to raise said counterbalancing weight and add its effect to that of the commodity being weighed.

Another object of my invention is to provide an automatic weighing scale which will be accurate and reliable and in which the weighing mechanism transmits the motion, produced by the commodity on the platform, very accurately to the computing and indicating mechanism.

These and other objects of my invention will be rendered apparent in the following specification, when taken in connection with the accompanying drawings and the novel features and combinations of parts will be more particularly set forth in the claims.

For the purpose of illustrating my invention and explaining the principle thereof, I have shown a specific embodiment in the accompanying drawing.

The drawing consists of a vertical section of the machine showing parts thereof in elevation.

The machine illustrated in the drawing belongs to the class known as automatic computing scales and is provided with a platform 5, upon which the commodity is placed, and with a computing chart 21, across which the indicating arm sweeps and comes to rest in the position indicating the weight and total price of the commodity being weighed.

The platform 5 is supported by a movable frame 6, which rests upon knife-edge bearings 7, carried by the supporting lever 8. The lever 8 in turn rests upon knife-edge bearings 9, which in turn are rigidly fixed to the base 11. A post 10 rising from said base carries said knife-edge bearings which therefore serve as a fulcrum for the lever. The long arm $8^a$ of said lever is pivotally connected at its extremity to the flexible metal tape 12 which rolls upon the circular portion of an equalizing lever 13. This equalizing lever receives a second flexible metal tape 14 which rolls upon its curved face and which is secured to the weight 17 suspended at its end.

The equalizing lever 13 is fixed to an indicating arm 18, said arm being counterbalanced by the weight 19 oppositely disposed with respect to the pivot $19^a$. Said pivot comprises knife-edge bearings suitably mounted in the frame of the machine. The indicating arm 18 is adapted to sweep across the computing chart 21 when the commodity is placed upon the platform 5 and to come to rest at such a position on said chart which will indicate the weight and total price of the commodity. The computing chart 21 is inclosed within an upright portion of the housing 20 in the manner well known to those skilled in the art.

The lever 8 is provided with a weighted portion 22 which normally overbalances the weight of the platform 5 and associated parts and also the suspended weight 17 in all except zero position of the parts. The arm $8^a$ is provided with a downwardly projecting conical lug or pivotal piece 24, which engages a corresponding conical recess 23, in a yoke $23^a$ pivotally connected with a hook 25 fixed to the tape 12 by a suitable clip 26.

The suspended weight 17 is provided with a guide 27, said guide having an inclined slot in which a pin 28 on said weight moves. The pin 28 does not contact with the walls of the slot, but moves in close relation thereto. By this means oscillation of the suspended weight is effectively checked without impairing the sensitiveness of the apparatus. The guide 27 is preferably secured to the walls of the casing by screws 29.

The indicating arm 18 is adjustably fixed to the equalizing lever 13 by means of an adjusting screw 30. This adjusting screw is rotatably mounted in a lug 32 said lug being fixed to the weighted end 19 of said indicating arm. Said adjusting screw is also rotatably attached to a lug 31 carried by said equalizing arm 13.

Suitable collars or shoulders at either side of the lug 32 prevent endwise movement of the screw, and adjusting nuts at either side of the lug 31 also prevent endwise movement of said screw but permit of longitudinal adjustment thereof. Said longitudinal adjustment permits the desired angular adjustment of the indicating arm 18 and the equalizing lever 13 about their common axis of movement.

The platform 5 and its associated parts are provided with a downwardly projecting rod 34 which is movably attached to a similar downwardly projecting rod 35 secured to the base. A link 36 pivotally attached at its ends to said rods 34 and 35 permits said movable connection and serves as a check for said platform. The said link prevents a movement of the platform 5 out of a horizontal position, or in other words, maintains said platform and associated parts in a condition of stable equilibrium. The link 36 has a position practically parallel to a line joining the knife-edges 7 and 9. The movements of the platform and associated parts therefore have a parallel character, and the sensitiveness and accuracy of the scale is thereby insured.

I have provided an auxiliary scale beam 37 with its associated auxiliary weight 38 as well as a second auxiliary weight 39 carried by the rod 39ª. These auxiliary weights permit of preliminary weighing of receptacles placed upon the platform before merchandise is placed in them, said preliminary weighing being of such a nature as will bring the scale mechanism to its zero position before the regular weighing of the merchandise which is placed in said receptacles.

In the operation and use of my improved scale, it is evident that when a commodity is placed upon the platform 5, the tendency of said commodity is to raise the weight 22 along with the lever arm 8ª. The suspended weight 17 will then be free to move downwardly until the effective length of the arm 15 of the equalizing lever 13 has been sufficiently reduced to cause equilibrium to be restored. It may be said that the commodity placed upon the platform 5 partly neutralizes the effect of the weight 22 and that the suspended weight 17 is then free to effect a movement of the parts until said suspended weight is again in equilibrium with said weight 22. The curvature of the arm 15 is such as to cause its effective radius to decrease at a uniform rate as it moves from its normal position and at a rate which is in proportion to the weight placed upon the platform 5. These proportions cause the arm 18 to move across the chart 21 to positions which are accurate indications of the variable weights of commodities which may be placed upon the platform.

While I have described my invention more or less precisely as regards the details of construction, I do not wish to be limited thereto unduly, as I contemplate changes in the form, in the proportion, and the substitution of equivalents as circumstances suggest or render expedient, without departing from the spirit of my invention.

I claim,—

1. In a device of the class described, a main lever, a commodity supporting element supported on said lever at one side of its fulcrum, an equalizing lever having a curved surface, a weight, a guide for said weight, said guide not contacting with said weight when hanging vertically, a flexible member supporting said weight, said flexible member being attached to said equalizing lever and adapted to roll upon the curved surface thereof, a second flexible member connecting the opposite end of said equalizing lever with the end of said main lever opposite to said commodity supporting element, said main lever being weighted on the end opposite said supporting element, weight and value indicating means operated by said equalizing lever, and means for adjusting and holding said weight and value indicating means in different indicating relations to said commodity supporting element.

2. In a device of the class described, a main lever, a commodity supporting element supported on said lever at one side of its fulcrum, an equalizing lever having a curved surface, a weight, a flexible member supporting said weight, said flexible member being attached to said equalizing lever and adapted to roll upon the curved surface thereof, a second flexible member connecting the opposite end of said equalizing lever with the end of said main lever opposite to said commodity supporting element, both said flexible members pulling down on said equalizing lever, said main lever being weighted on the end opposite said supporting element, a base for said mechanism, a downwardly projecting arm rigid with said commodity support, and a link pivotally attached to said arm and to said base.

3. In a device of the class described, a main lever, a commodity supporting element supported on said lever at one side of its fulcrum, an equalizing lever having a curved surface, a weight, a flexible member supporting said weight, said flexible member being attached to said equalizing lever and adapted to roll upon the curved surface thereof, a second flexible member connecting the opposite end of said equalizing lever with the end of said main lever opposite to said commodity supporting element, both said flexible members pulling down on said equalizing lever, said main lever being weighted on the end opposite said supporting element, weight and value indicating means operated by said equalizing lever, and a counterbalance for said indicating means.

4. In a device of the class described, a main lever, a commodity supporting element supported on said lever at one side of its fulcrum, an equalizing lever having a curved surface, a weight, a flexible member supporting said weight, said flexible member being attached to said equalizing lever and adapted to roll upon the curved surface thereof, a second flexible member connecting the opposite end of said equalizing lever with the end of said main lever opposite to said commodity supporting element, said main lever being weighted on the end opposite said supporting element, and weight and value indicating means operated by said equalizing lever and adjustable to different indicating relations to said commodity supporting element.

5. In combination, a main lever with an intermediate fulcrum, a commodity receiver on one end and a weight on the opposite end, a curved lever, a tape fastened thereto and wrapped on the curved portion thereof, a weight hung by said tape, and a connection from the weighted end of the main lever to the curved lever, said tape and said connection both pulling down on said curved lever, and both lying in the same plane perpendicular to the turning axis of the curved lever.

6. In combination, a main lever with an intermediate fulcrum, a commodity receiver on one end and a weight on the opposite end, a curved lever, a hanging weight, a connection therefrom to one side of said curved lever and a connection from the weighted end of the main lever to the other side of said curved lever, one of said connections comprising a flexible tape wrapped on the curved lever, and both said connections pulling down on the curved lever, the resultant lines of pull both lying in the same plane perpendicular to the turning axis of the curved lever.

7. In combination, two levers of the first order, an operative connection from an end of one lever to an end of the other lever, a commodity receiver on the remaining end of one lever, the remaining end of the other lever being curved, a flexible tape connected to said curved end and adapted to wrap thereon, a weight hung by said tape, and another weight attached to one of the two levers at a point adjacent to its connection with the other lever.

In testimony whereof, I have subscribed my name.

JOSEPH HOPKINSON.

Witnesses:
A. S. HENDRICKS,
H. A. LEONARD.

Copies of this patent may be obtained for five cents each, by addressing the "Commissioner of Patents, Washington, D. C."